United States Patent [19]
Anderson et al.

[11] Patent Number: 6,070,537
[45] Date of Patent: Jun. 6, 2000

[54] AQUATIC PLANTING PROCESS AND RELATED APPARATUS

[75] Inventors: James F Anderson; Kenneth M. Cox, both of Ruskin, Fla.

[73] Assignee: James F. Anderson, Ruskin, Fla.

[21] Appl. No.: 09/104,681

[22] Filed: Jun. 25, 1998

[51] Int. Cl.⁷ .................................................. A01C 11/00
[52] U.S. Cl. .......................... 111/114; 111/200; 111/900; 111/906; 111/918; 47/59; 47/64; 47/74
[58] Field of Search ..................................... 111/114, 200, 111/900, 906, 918; 114/221 R, 221 A; 47/74, 59, 64

[56] References Cited

U.S. PATENT DOCUMENTS

| | | | |
|---|---|---|---|
| D. 397,987 | 9/1998 | Anderson | D12/306 |
| 3,250,606 | 5/1966 | Murray | 71/1 |
| 3,640,698 | 2/1972 | Backlund | 71/29 |
| 3,705,659 | 12/1972 | Mackie | 47/74 X |
| 3,867,124 | 2/1975 | Church | 71/1 |
| 3,921,548 | 11/1975 | Alkemade | 111/114 X |
| 4,111,135 | 9/1978 | Braun et al. | 111/114 |
| 4,133,274 | 1/1979 | Orth et al. | 111/114 X |
| 4,336,669 | 6/1982 | Gordon | 47/74 |
| 4,402,725 | 9/1983 | Heller et al. | 71/27 |
| 4,713,896 | 12/1987 | Jennens | 37/308 |
| 4,908,986 | 3/1990 | Rowland et al. | 47/64 X |
| 4,918,863 | 4/1990 | Youssef | 47/74 X |
| 5,525,505 | 6/1996 | Young et al. | 47/59 X |

FOREIGN PATENT DOCUMENTS

| | | |
|---|---|---|
| 1T0327 | 7/1936 | Italy . |

*Primary Examiner*—Victor Batson
*Attorney, Agent, or Firm*—Donald R. Bahr

[57] ABSTRACT

A process for planting aquatic plants underwater on the bottom of estuarys where an aquatic plant which is ready for transplanting is positioned in a holder having a device for retaining the transplantable plant and a thin base. When the holder is brought into contact with the underwater bottom the thin base engages the underwater bottom and secures the holder including the plant in underwater bottom. A watercraft having apparatus for positioning the holder incorporating the aquatic plant on the bottom of an estuary is also provided for. With this apparatus and the holder of this invention aquatic plants can be planted on the bottom of estuary in a semiautomated fashion. The holder also incorporates an organic buttom which retains the aquatic plant during the planting process.

23 Claims, 4 Drawing Sheets

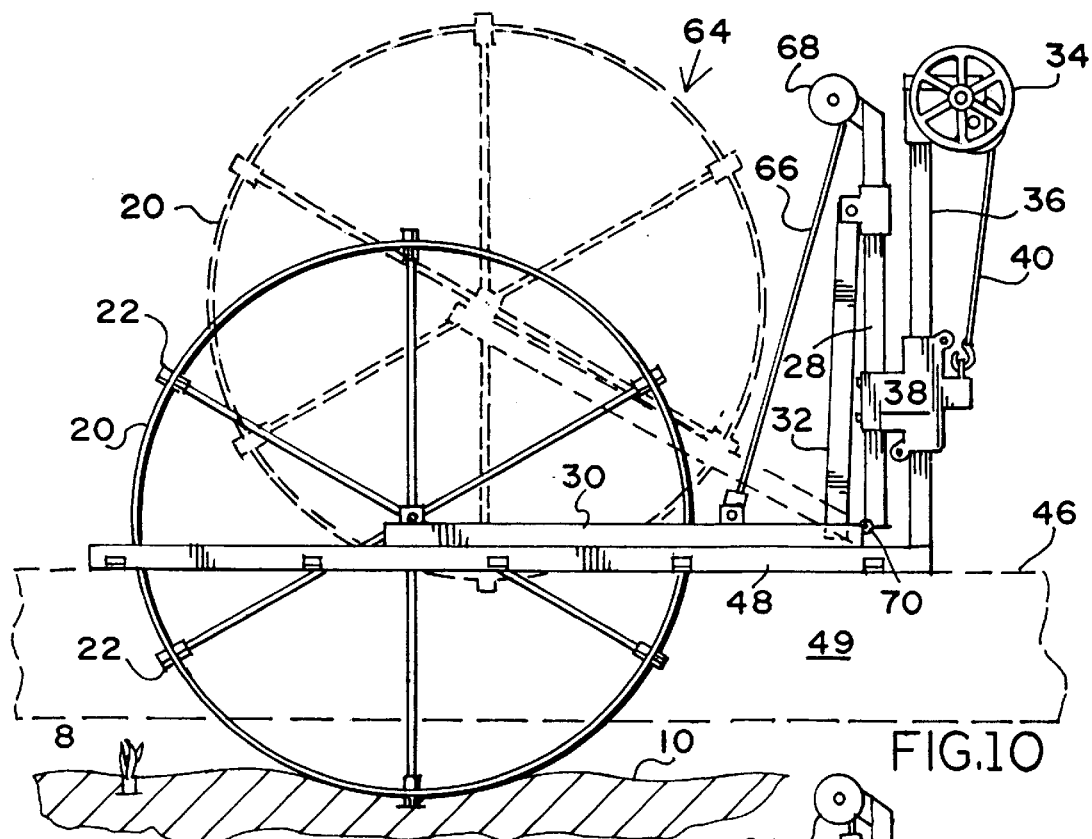
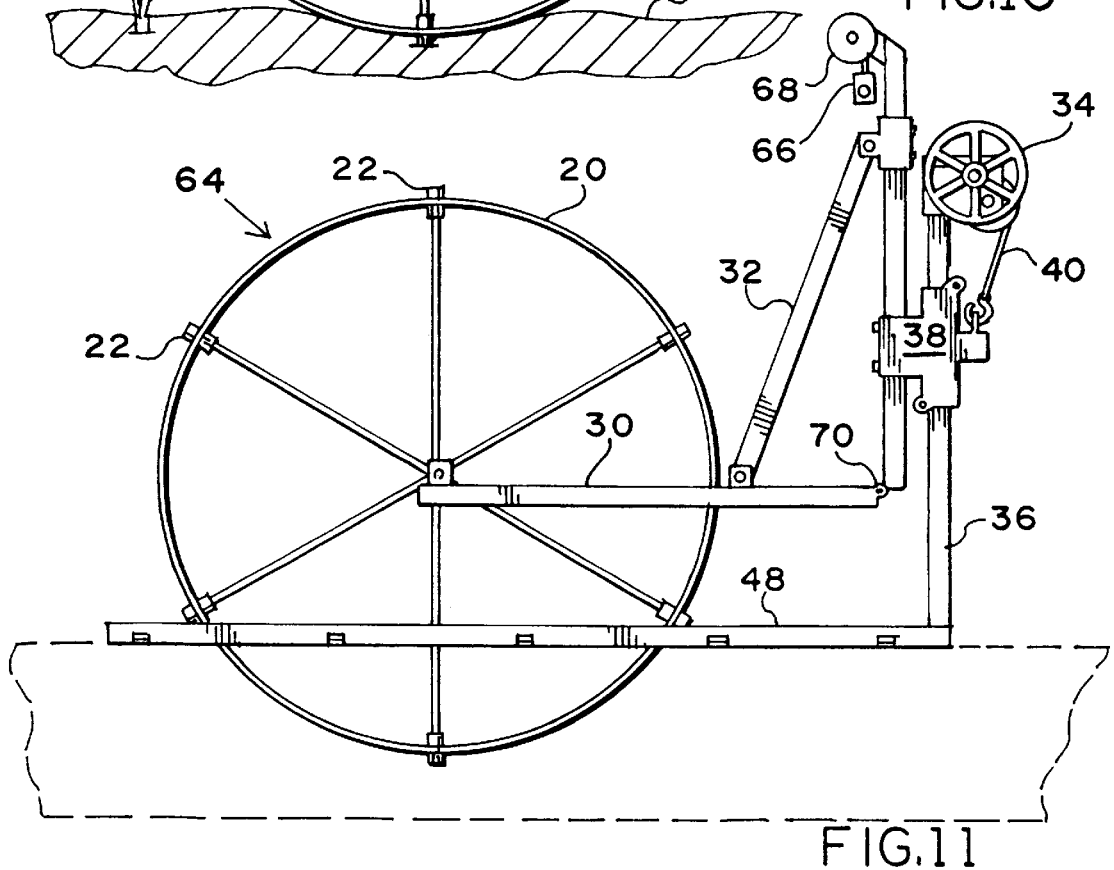

AQUATIC PLANTING PROCESS AND RELATED APPARATUS

BACKGROUND

This invention is concerned with a process and related apparatus whereby aquatic plants may be planted underwater for purposes of restoration. The restoration of all aspects of the environment has become extremely important in recent years. The three areas of restoration which are of primary importance are reducing air pollution, restoring and cleaning up the land and cleaning up and restoring our waterways, the ocean and related estuaries. It is these related estuaries that are the primary thrust of the subject invention.

As a result of the decrease in water quality millions of acres of aquatic plant life, which form an important part of the aquatic eco system have been destroyed. That is because of a decrease in water quality, in other words pollution, aquatic plant life has been destroyed. In most cases this destruction has been gradual over a long period of years however in some instances it can be rapid for example as a result of a ship wreck.

Because aquatic plant life is an important part of the complex aquatic environment the restoration of this plant life is of primary importance.

The natural restoration of aquatic plant life is an extremely slow process. While it is possible to manually plant shoots of aquatic plants due to the cost of labor the manual planting of sea grass plants is at best been marginally successful. Due to the difficulty of manually planting shoots of aquatic plants the cost of manually planting just one acre of an estuary can cost many tens of thousands of dollars. Further manual planting in some instances is of questionable success as the person doing the planting in walking over the bottom of an estuary does further damage by crushing other plants which may be growing in the area.

This invention is concerned with a process and apparatus whereby sea grass can be quickly planted in an economical fashion.

As used in connection with this invention the term aquatic plant life and sea grass includes many species of plant life such as halodule wrightii (shoal grass), thalassia (turtle grass) etc.

Aquatic plant life as it exists in estuaries is important in preventing water pollution as this plant life acts as a filter for many pollutants and hence this plant life helps to maintain water quality.

The restoration of aquatic life to the bottom of our estuaries is extremely important as this aquatic plant life plays a critical function in the total marine eco system. A large number of important marine animals, both warm and cold blooded, rely totally or in part on this aquatic plant life for as a breeding area, for cover, for food etc. For example the endangered manatee relies solely on sea grass as its food source.

OBJECTS

The primary object of this invention is a process whereby aquatic plant life may be positioned on and planted in the bottom of an estuary.

Still another object is related apparatus whereby this planting may be effected with minimal damage to the bottom of the estuary.

Still another object of this invention is a process for growing aquatic plant life such that it is suitable for planting on the bottom of an estuary.

DESCRIPTIONS OF THE DRAWINGS

FIG. 10 is a side view of an alternate planter in a planting mode.

FIG. 11 is a side view of an alternate planter in a raised transport mode.

DESCRIPTION OF THE PREFERRED EMBODIMENT

The subject invention relates to a process for planting aquatic plants such as a wide variety of sea grasses. The invention is also concerned with a process for growing aquatic plants such that they are suitable for use with the process and apparatus of this invention.

The process of this invention in its broadest terms comprises the growing and positioning of a shoot of an aquatic plant in a holder which facilitates its planting underwater.

Figure 1:
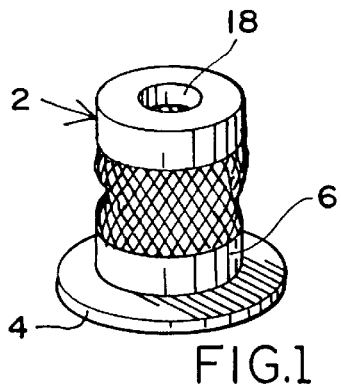
FIG. 1 is a perspective view showing a holder as used in the subject invention.
Figure 2:
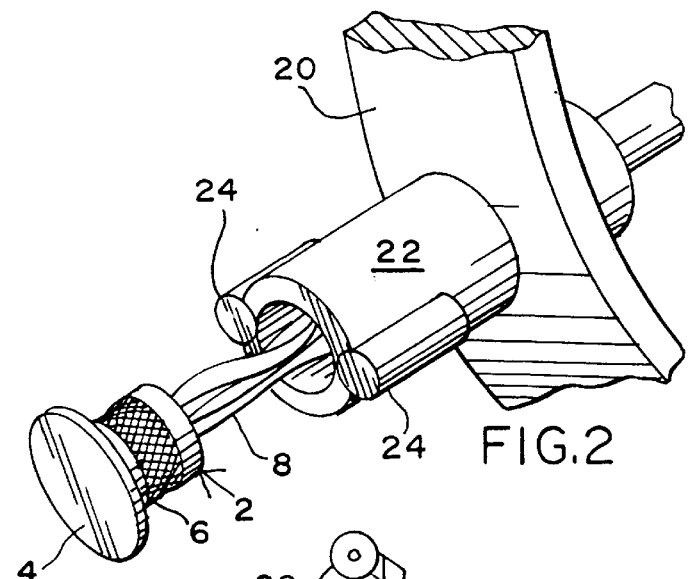
FIG. 2 is a sectioned perspective view showing the placement of a holder in the planting apparatus.

Referring to FIG. 1 and 2 it can be seen that the holder 2 as used in this invention comprises a base 4 and a button 6 to which is attached to base 4. As is illustrates base 4 is circular however it is understood by one skilled in the art that base 4 could assume other configurations. A central feature of this invention is the fact that base 4 assist in the planting of the aquatic plant and its positioning underground and then it dissolves or corrodes away. That is the function of base 4 is only to position plant 8 such that it is underground and hence in a position to grow.

Figure 4:
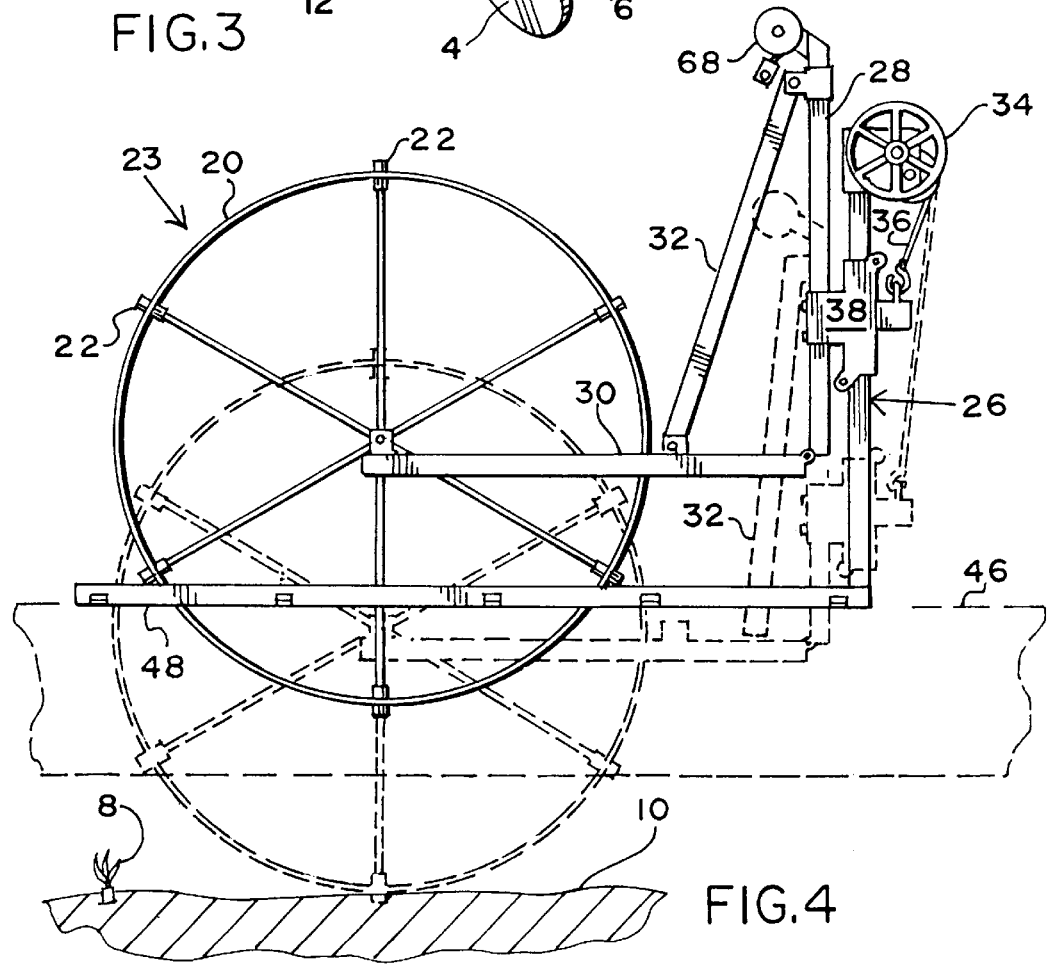
FIG. 4 is a side view of the planter of this invention is a planting and transport mode.

Base 4 in its simplest form consist of a metallic disc which is formed from a ferrous material. FIG. 2 shows holder 2 with plant shoots 8 positioned therein ready to be inserted into the related apparatus of this invention. Once plant 8 is properly positioned on the estuary bottom 10, base 4, as is shown in FIG. 4, is exposed to a corrosive environment and corrodes away. If base 4 is formed from a ferrous material it rusts away. The disappearance of base 4 can be very rapid if the aqueous environment consist of warm salt water. That is base 4 if formed from a uncoated ferrous alloy it can be expected to rust away in 60 to 90 days. When base 4 is formed from a ferrous metal a thickness of from about 0.010 to about 0.100 inches is desirable, with a preferred thickness being inches.

Base 4 can also be formed from polymeric materials which are not harmful to the environment or polymeric materials which are blended with materials such as starch. These blended polymeric materials can be engineered to decompose in a set period of time after being exposed to ultraviolet light or to an aqueous environment such as warm salt water.

When base 4 if formed from a metal the rate at which it corrodes away depends on the temperature and salinity of the water.

Figure 3:
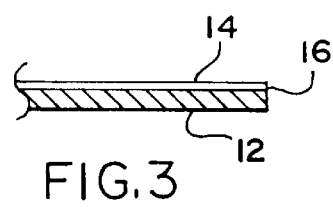
FIG. 3 is a sectioned side view of an alternate base structure.

Base 4 can be formed from a coated material such as a ferrous material which is coated with a polymeric composition which protects the base ferrous material for a limited period of time. This environment is illustrated in FIG. 3 wherein it can be seen that base 16 comprises a composite structure. In this case composite base 16 comprises a ferrous metallic disc 12 which is coated on one or more sides with a semi protective coating 14. Coating 14 is semi protective as it protects base 4 from corrosion for a limited period of time for example 60 days. This limited protection is important as it allows an aquatic plant 8 to be planted in a nursery and allowed to grow in a nursery environment for a period of time which is related with the life of semi protective coating 14. Once plant 8 has matured and ready to plant semi protective coating 14 is about to extinguish such that ferrous disc 12 is about to start its final corrosion process once the composite structure is positioned on the bottom of an estuary.

Semi protective coating as illustrated can be a polymeric coating or a metallic coating of a protective metal such as aluminum, copper, lead etc. By controlling the thickness of semiprotective layer 14, the length of time it takes for metallic disc 12 to corrode away can be controlled.

Button 6 can be formed from any material which is capable of holding plant 8 during the planting process. In the preferred embodiment button 6 is formed from an organic material such as compressed peat moss, compressed polystyrene beads, compressed manure, mixtures thereof etc. Button 6 incorporates "a means for retaining plant 8, such as aperture 18". Buttons being formed from compressed peat are the preferred embodiment for use with this invention as they are capable of holding plant 8 during incubation in a nursery and during planting.

Button 6 is used in this invention may be laced with fertilizer and trace minerals which aid in the growth and root formation of plant 8.

As can be seen in FIG. 2 button 6 expands after plant 8 is positioned therein and button 6 is exposed to an aqueous environment.

Once plant 8 has been incubated in a nursery and has formed roots, the composite structure 18 comprising a base 4, a swollen bottom 6 and a rooted plant 8 is placed in an apparatus to facilitate planting. In FIG. 2 suitable apparatus is shown as a wheel 20. The function of the apparatus of the subject invention is position composite structure 18 and the bottom of an estuary and yet permit easy removal of the composite structure 18 from the apparatus once base 4 comes into contact with and grips the bottom of the estuary.

Figure 5:
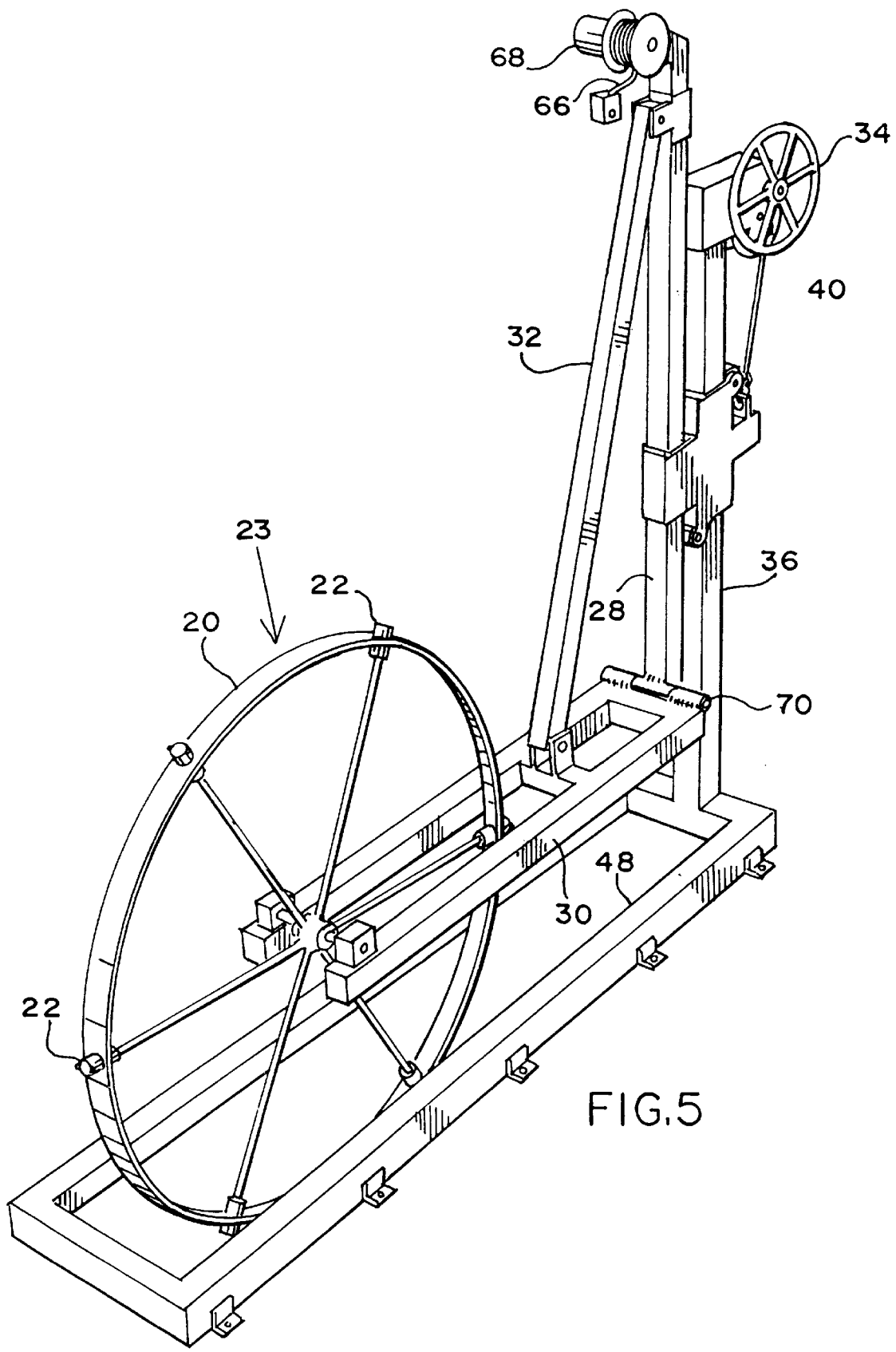
FIG. 5 is a perspective view of the planter in a transport mode.

In the preferred embodiment as is illustrated in FIG. 2,4 and 5 wheel 20 incorporates a plurality of nipples 22 on its pheriary. The spacing of nipples 22 on wheel 20 and the diameter of wheel 20 controls the distance at which plants 8 will be planted on the estuary bottom apart from each other.

In the preferred embodiment nipple 22 incorporates a hollow magnet 24 which is capable of gripping base 4 when said base is formed from a ferrous material. Magnet 24 may be cylindrical or donut shaped.

Figure 6:
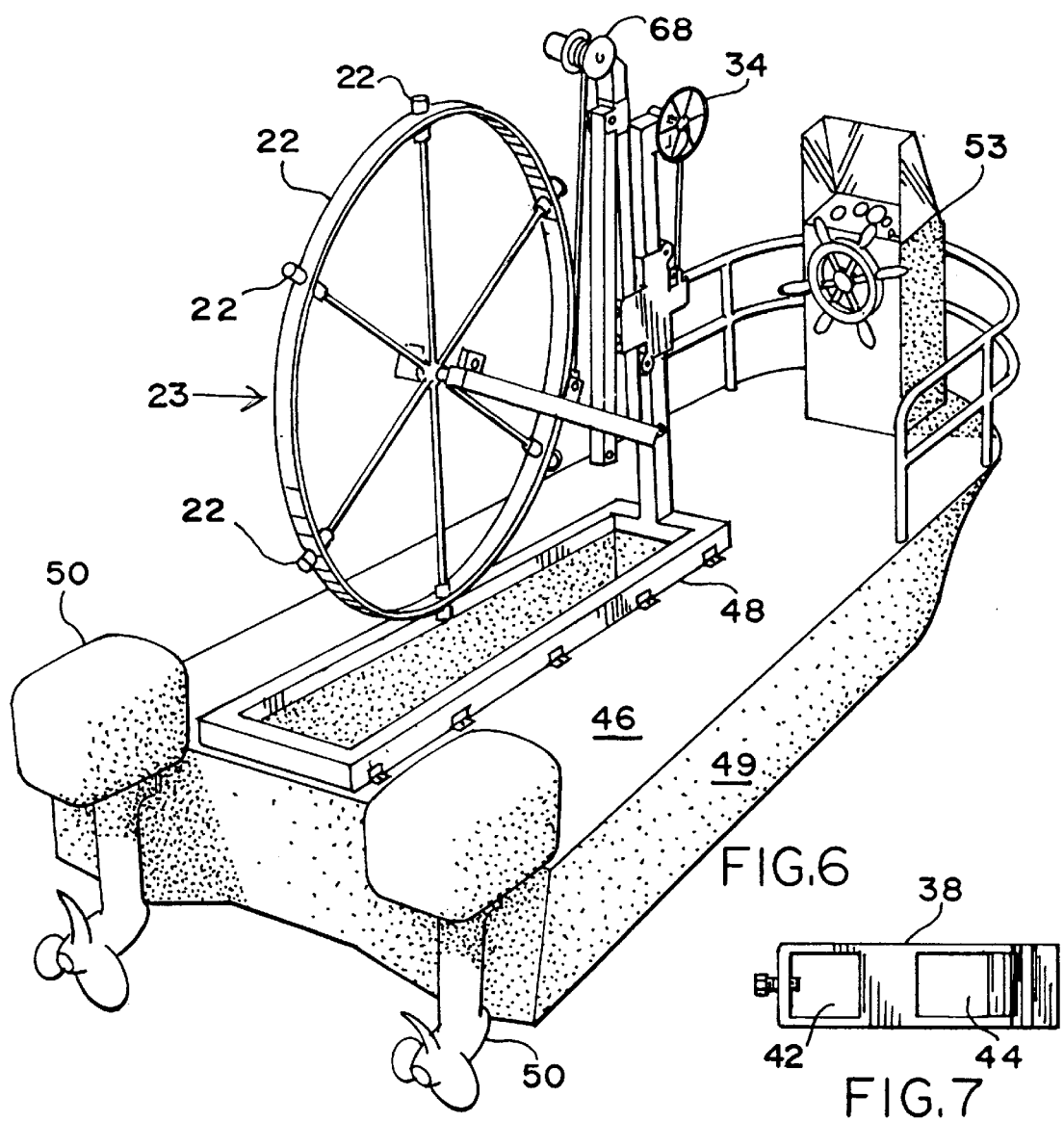
FIG. 6 is a perspective view of the planter positioned on a watercraft.

In operation composite structure 17 is formed and plant 8 has formed roots such that it is ready for transplanting. A that point a large number of composite structures 17 are loaded onto a watercraft into which is a built a planter 23 as is shown in FIG. 6. Planter 23 can be built into any suitable watercraft however the preferred watercraft is a twin pontoon float boat. Twin pontoon float boats are preferred as they are very stable and they allow planter 23 to be positioned into and between the twin pontoons.

In planter 23 as is illustrated in FIG. 4,5,6, 7 and 10 holder 20 is illustrated as a circular wheel. It is understood that wheel 20 could assume other forms such as a continuous oval track on which is positioned a plurality of nipples 22.

Planter 23 further incorporates means whereby holder 20 can be positioned adjacent to the bottom of the estuary at various depths. In most instances an adjustment range wherein wheel 20 can be positioned adjacent to the estuary bottom at depths of one to six feet is adequate.

In the embodiment as is illustrated in FIG. 4,5,6 and 7 planter 23 comprises a wheel 20 and an adjustment mechanism 26. As can be seen adjustment mechanism 26 comprises a mast 28 to which is attached a support arm 30. Support arm 30 is further braced by arm 32, support arm 30 may be raised and lowered in such a manner that the periphery of wheel 2 is kept in contact with estuary bottom 10. When wheel 20 is raised for transport arm 32 is attached to support arm 30. When adjustment mechanism 26 is lowered, as is shown in dotted lines arm 32 is detached from support arm 30, thereby allowing wheel 20 to roll freely on estuary bottom 10.

Figure 7:
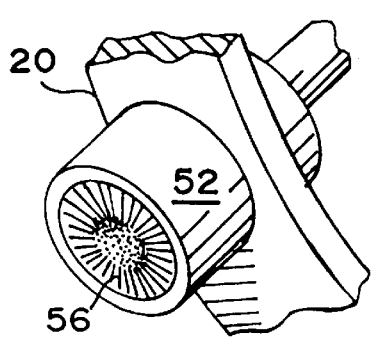
FIG. 7 is a top plan view of the winch block which is part of the planter.

The raising and lowering of support arm 30 on mast 28 is effected by winch block 38 which is in turn supported by shaft 36. Winch block 38 is slideably mounted on shaft 36. Winch 34 is attached to winch block 38 via winch cable 40 as can be seen in FIG. 7 winch 38 incorporates a pair of apertures 42 and 44 in which are positioned mast 28 and shaft 38. Winch block 38 is secured to mast 28. When winch cable 40 is shortened winch block 38 is raised, and slides on shaft 36 thereby raising wheel 20 such that the planter 23 is suitable for use in shallow water. Conversely when winch cable 40 is lengthened which block 38 slides downward on shaft 36 and planter 23 is lowered such that the overall structure is suitable for use in deeper water.

As is shown in FIG. 5 planter 23 is further supported by frame 48 on deck 46 which is in turn attached to hull 49. From FIG. 6 it can be seen that the preferred hull is a twin pontoon hull which is powered by a pair of outboard motors 50 and steered by steering mechanism 53.

Figures 8, 9:
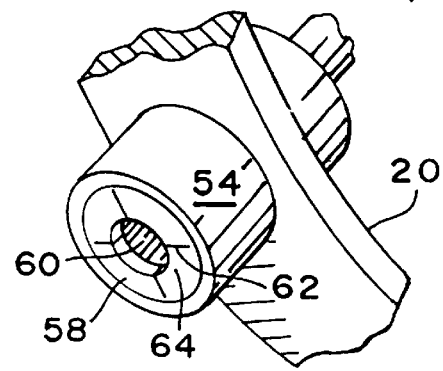
FIG. 8 is a perspective view of an alternate holder structure.
FIG. 9 is a perspective view of an alternate holder structure.

FIGS. 8 and 9 illustrate alternate nipple structures. In FIG. 8 alternate nipple structure 52 incorporates a plurality of bristles 56 which are adapted to grip button 6 of composite structure 18.

Alternate nipple structure 54 incorporates a diaphram 58 which further has an aperture 60 and a plurality of slits 62. Aperture 60 should be slightly smaller than the diameter of button 6.

When composite structure 17 is inserted into nipple 54 button 6 is placed in aperture 60 and button 6 is gripped by flaps 64 which are defined by slits 62.

In both alternate nipple structures 52 and 54 the physical properties of bristles 56 and diaphragm 58 are engineered such that composite structure 17 is retained in nipples 52 and 54 during the planting process and yet removed from nipples 52 and 54 when base 4 engages the estuary bottom.

FIGS. 10 and 11 show an alternate planter embodiment 64. When comparing planter 64 to planter 23 as is shown in FIGS. 4 and 5 it can be seen that an additional arm 32 a related support cable 66 has been added which is in turn attached to support arm 30 and a second winch 68. Winch 68 is attached to the top of mast 28. Arm 30 is further pivotally attached to the lower extremity of mast 28.

As can be particularly seen in FIG. 11 when the cable of winch 34 is shortened winch block 38 is raised on shaft 36 thereby causing planting wheel 20 to be raised. This procedure is described above in connection with FIGS. 4 and 5.

As is illustrated in FIG. 10 when support cable 66 is shortened arm 30 is caused to rotate on pivot point 70. When support cable 66 is lengthened arm 30 pivots downward causing wheel 20 to ride on estuary bottom 10. Because support cable 66 is flexible it offers no resistance to the upward movement of arm 30. This lack of resistance to the upward movement of arm 30 allows planting wheel 20 to roll over and to conform to an uneven estuary bottom. That is if planting wheel 20 encounters a depression in the estuary bottom gravity will cause planting wheel 20 to drop into the depression thereby allowing an even planting of aquatic plants an uneven estuary bottom 10. Conversely if planting wheel 10 encounters a raised area an estuary bottom 10 planting wheel 20 can easily roll up and conform to the raised area as support cable 66 offers no resistance to the upward movement of planting wheel 20.

The above description and drawings are illustrative of modifications that can be made without departing from the present invention, the scope of which is to be limited only by the following claims.

What is claimed is:

1. A process for planting aquatic plants underwater in an estuary having a bottom which comprises the steps of;
   a. positioning an aquatic plant in a holder which has an aquatic plant retaining section and an estuary bottom gripping section
   b. positioning said holder in a suitable moving apparatus for causing said holder to move and come into contact with the bottom of an estuary, whereby said estuary bottom gripping section engages the bottom of said estuary, wherein the continued movement of said holder containing the aquatic plant causes said holder to be removed from the apparatus, wherein said holder is adapted to disenegrate in a predetermined period of time.

2. The process of claim 1 wherein the aquatic plant retaining section is an organic medium which is condusive of aquatic plant growth and wherein the holder disengrates as a result of the corrosive action of the aquatic environment.

3. The process of claim 1 wherein the aquatic plant retaining section comprises an organic medium which is condusive to aquatic plant growth and wherein the holder disenegrates as a result of the corrosive action of the aqueous environment.

4. The process of claim 1 wherein the estuary bottom gripping section of said holder comprises a thin sheet section which is formed from a metal.

5. The process of claim 2 wherein the estuary bottom gripping section of said holder comprises a thin sheet section which is formed from a metal.

6. The process of claim 4 wherein the estuary bottom gripping section comprises a thin circular disc of a ferrous metal.

7. The process of claim 4 wherein the estuary bottom gripping section is formed from a corrodable metal which incorporates a coating which regulates the period of time which it takes to corrode away in the aqueous environment.

8. The process of claim 5 wherein the estuary bottom gripping section incorporates a coating which will regulate the period of time which it takes to corrode away in the aqueous environment.

9. The process of claim 7 wherein the coating is a polymeric coating.

10. The process of claim 8 wherein the coating is a metal which is different than the metal from which the thin sheet section is formed.

11. The process of claim 8 wherein the coating is a metal which is plated onto the estuary bottom gripping section.

12. The process of claim 2 wherein the aquatic plant retaining section comprises a button of compressed peat moss.

13. The process of claim 6 wherein the apparatus incorporates a magnet which is capable of gripping the ferrous circular disc.

14. The process of claim 12 wherein the apparatus comprises a wheel having a plurality of nipples on its periphery which are adapted to engage said holder.

15. The process of claim 14 wherein said nipples are circular the outer edges of which incorporate donut shaped magnets which are adapted to engage said ferrous circular disc.

16. A process for planting aquatic plants underwater in an estuary having a bottom which comprises the steps of
   a. forming a holder which comprises a compressed peat moss button, having a central aperture, which is secured to a thin ferrous metal disc;
   b. placing an aquatic plant having a stem in the central aperture of said peat moss button;
   c. placing the holder containing the aquatic plant in a hollow nipple, the outer extremity of which incorporates a magnet, the stem of the aquatic plant being placed in the hollow nipple, said hollow nipple being part of an apparatus whereby the nipple can be brought into contact with the bottom of said estuary;
   d. operating said apparatus in such a manner that the nipple with the holder attached thereto is brought into contact with the underwater estuary bottom, in such a manner that the ferrous disc engages the underwater estuary bottom such that it is removed from the nipple, thereby planting the aquatic plant in the underwater estuary bottom.

17. An underwater planter for aquatic plants comprising
   a. a hull which has sufficient bouyency for transporting and positioning the planter to an area where the aquatic plants are to be planted underwater;
   b. a planting wheel which is supported by said hull wherein said planting wheel is adapted to roll underwater over an estuary having a bottom wherein spaced on the periphery of said planting wheel are nipples which are adapted to receive aquatic plants where said aquatic plants are further supported on sheet sections which can be engaged by said nipples;
   c. a means for varing the distance that the planting wheel extends below the waterline of said hull;
   d. a means for propelling the hull through the water thereby causing the wheel to roll along the estuary bottom causing the aquatic plants to be planted thereon.

18. The planter of claim 17 wherein the hull is a monohull, the sheet sections are discs which are from a ferrous metal and the nipples incorporate magnets which are adapted to engage the said disc.

19. The planter of claim 17 wherein the hull comprises two pontoons and the planter is positioned between said pontoons.

20. The planter of claim 17 wherein the nipples are circular and hollow one terminal end being attached to the planting wheel the other terminal end incorporating a magnet which is adapted to engage the sheet section.

21. An underwater aquatic plant holder, for retaining an aquatic plant for use in underwater planting, which comprises a button of organic material having first and second parallel planar surfaces, wherein approximate the first planar surface is a means for retaining an aquatic plant shoot, and attached to said second planar surface is a section of rigid sheet material.

22. The holder of claim 21 wherein the sheet material has a thickness of from about 0.010 inches to about 0.100 inches and is formed from a metal or a polymeric material.

23. The holder of claim 21 wherein the sheet material is shaped in the form of a disc, formed from a ferrous material and has a thickness of from about 0.010 to about 0.020 inches and the button is formed from a member selected from the group consisting of compressed peat moss, compressed paper, compressed manure, compressed expanded polystyrene beads and mixtures thereof.

* * * * *